(12) United States Patent
Bombay et al.

(10) Patent No.: US 6,999,517 B1
(45) Date of Patent: Feb. 14, 2006

(54) METHOD AND APPARATUS FOR TRANSMISSION OF DATA ON MULTIPLE PROPAGATION MODES WITH FAR-END CROSS-TALK CANCELLATION

(75) Inventors: Bart J. Bombay, Austin, TX (US); Lloyd D. Clark, Jr., Austin, TX (US)

(73) Assignee: Sehlumberger Technology Corporation, Sugar Land, TX (US)

( * ) Notice: Subject to any disclaimer, the term of this patent is extended or adjusted under 35 U.S.C. 154(b) by 771 days.

(21) Appl. No.: 09/590,657

(22) Filed: Jun. 7, 2000

(51) Int. Cl.
  *H04B 3/32* (2006.01)
  *H04L 25/08* (2006.01)

(52) U.S. Cl. .................. 375/257; 375/222; 375/229; 375/346; 340/354.9; 370/201; 370/286

(58) Field of Classification Search ............... 375/275, 375/257, 261, 229, 232, 284, 222, 346; 340/854.9, 340/855.3; 367/182, 25; 324/338; 704/226; 370/201, 286
  See application file for complete search history.

(56) References Cited

U.S. PATENT DOCUMENTS

| | | | |
|---|---|---|---|
| 3,514,750 A | | 5/1970 | Pritchett et al. |
| 4,450,555 A | | 5/1984 | Pays |
| 5,010,333 A | * | 4/1991 | Gardner et al. .......... 340/855.3 |
| 5,181,198 A | | 1/1993 | Lechleider |
| 5,387,907 A | * | 2/1995 | Gardner et al. .......... 340/854.9 |
| 5,473,321 A | * | 12/1995 | Goodman et al. ....... 340/854.9 |
| 5,838,727 A | * | 11/1998 | Lyon et al. ................. 375/261 |
| 5,887,032 A | * | 3/1999 | Cioffi ......................... 375/257 |
| 5,970,088 A | | 10/1999 | Chen |
| 5,982,249 A | | 11/1999 | Bruns |
| 6,647,067 B1 | * | 11/2003 | Hjelm et al. ................ 375/260 |

FOREIGN PATENT DOCUMENTS

| | | |
|---|---|---|
| EP | 0 814 574 A | 12/1997 |
| WO | 99/32215 A | 7/1999 |
| WO | WO 99/44352 | 9/1999 |

OTHER PUBLICATIONS

International Search Report in PCT/US01/17566 dated Jul. 24, 2002 (7pages).

* cited by examiner

*Primary Examiner*—Khai Tran
*Assistant Examiner*—Edith Chang
(74) *Attorney, Agent, or Firm*—Tim Curington; Robin Nava

(57) ABSTRACT

A digital telemetry system having improved data rate and robustness. The telemetry system has a data transmission cable having a first end and a second end, and is capable of transmitting data between the first and second end on at least two propagation modes. A data source connected at the first end has data transmission circuitry to generate data signals on these propagation modes. A receiver connected to the second end of the wireline cable has a first receive circuitry to receive signals on a first of the at least two propagation modes and a second receive circuitry to receive signals on a second of the at least two propagation modes. An adaptive far-end cross-talk cancellation circuitry connected to the first receive circuitry and to the second receive circuitry cancels out far-end cross-talk between the at least two propagation modes.

12 Claims, 7 Drawing Sheets

METHOD AND APPARATUS FOR TRANSMISSION OF DATA ON MULTIPLE PROPAGATION MODES WITH FAR-END CROSS-TALK CANCELLATION

TECHNICAL FIELD

This invention relates in general to the field of transmission of data from a well-logging tool to a data acquisition system over an electrical cable, and in particular, to a method and apparatus for improving data rate and robustness when transmitting data in multiple propagation modes by cancellation of far-end cross-talk at the receiver.

BACKGROUND OF THE INVENTION

Accurate and rapid collection and distribution of geophysical property data is a key to successful exploration and production of petroleum resources. Based on data such as electrical and nuclear properties collected in a well-bore, as well as the propagation of sound through a formation, geophysicists make an analysis useful in making many important operational decisions. The analysis includes determination of whether a well is likely to produce hydrocarbons, whether to drill additional wells in the vicinity of an existing well, and whether to abandon a well as being unproductive. Geophysicists may also use well-bore data to select where to set casing in a well and to decide on how to perforate a well to stimulate hydrocarbon flow. One method of collecting well-bore geophysical properties is by way of wireline well-logging. In wireline well-logging, a well-logging tool (also often referred to as a sonde) is lowered into a well-bore on an electrical cable, the wireline. The well-logging tool is an electrically powered measurement device that may, for example, collect electrical data, sonic waveforms that are propagated through the surrounding formation, or radioactivity counts. These measurements are usually converted to a digital form and transmitted on the wireline. Systems for transmitting data from the well-logging tool to a surface data acquisition system over a wireline cable are known as wireline telemetry systems.

One prior art wireline telemetry system is the Digital Telemetry System (DTS) of Schlumberger Technology Corporation. U.S. Pat. No. 5,838,727 (hereinafter, 727; incorporated herein by reference) describes DTS. Another wireline telemetry system is described in co-pending U.S. patent application Ser. No. 09/471,659 which is incorporated herein by reference.

Wireline cables are primarily designed for mechanical strength and power delivery. A modern oil well may be drilled to a depth of in excess of 30,000 feet. The cable must be able to sustain the tension generated from the weight of the logging tools and the weight of the lengthy cable itself. The cable must also deliver relatively large quantities of power by alternating current or direct current to the toolstring. High frequency signal transmission properties, on the other hand, are given a lower priority. Therefore, wireline cables are not ideal conveyors of the information that is transmitted from the well-logging tools. It is desirable to provide wireline telemetry systems that can be tailored for specific or individual cables and conditions to maximally use the data delivery capabilities of a specific wireline cable.

Using a formula, known as Shannon's capacity formula, it is possible to determine a theoretical maximum channel capacity of a communication channel given a certain level of noise. Prior art well-logging telemetry systems achieve data rates that are considerably lower than the theoretical capacity. While it may not be practical (or even possible) to build a system that does achieve the Shannon capacity, it is nevertheless desirable to provide a system that achieves a data rate that comes as close as possible to the Shannon capacity for a given wireline cable.

Because of the electrical limitations on a wireline cable, the signal-to-noise ratio can be unacceptably high and significantly impact the data rate. It would be desirable to provide a system and method which overcomes the signal-to-noise ratio problems associated with wireline telemetry systems.

Modern wireline cables contain several electrical conductors, for example, 7 wires and the outer armor. Data can be simultaneously transmitted on these several conductors. The distinct combinations of conductors used are referred to herein as "propagation modes". Far-end cross-talk between the several propagation modes used simultaneously is a significant source of noise in data transmission. Far-end cross-talk is the interference between data transmitted in one propagation mode and the data transmitted in another propagation mode. Far-end cross-talk is caused by imperfections in the symmetry or insulation of the wireline cable, as well as circuitry that is used for interfacing to the cable downhole and at the surface. Far-end cross-talk impacts both data rate and robustness of the data transmission. Cross-talk limits the available data rate and reliability. For example, cross-talk can lead to transmission failures during the progress of a logging job.

Hitherto the impact of far-end cross-talk has been avoided by precise cable design or by decreasing data rate. For example, cross-talk may be avoided by requiring near perfect electrical insulation, perfect geometry and near perfect conduction properties. Naturally, these requirements increase the cable cost and also causes the need to decommission cables relatively early due to wear. Furthermore, cross-talk may occur at the cable heads. Therefore, there is also a requirement to maintain very high insulation standards at the cable heads. Doing so can be very difficult in the harsh conditions encountered in logging jobs, e.g., high temperature and pressure.

An alternative approach to reduce the impact of far-end cross-talk is to reduce the data rate. At lower data rates the data transmission is more resilient to noise, including the noise produced by cross-talk. However, having lower data rates increases the time required for logging a well and therefore the costs associated with the logging operation and the costs due to putting other operations on hold while the well is being logged.

From the foregoing it will be apparent that there is still a need for a way to minimize the impact that far-end cross-talk has on throughput and reliability in a wireline telemetry system.

SUMMARY OF THE INVENTION

The deficiencies in the prior art are solved in the present invention which, in a preferred embodiment, provides a wireline telemetry system in which multiple propagation modes are used while maintaining a high data rate and robustness by cancelling out the effect of far-end cross-talk. The system thereby provides significantly greater throughput than prior art wireline telemetry systems.

The digital telemetry system of the invention has improved data rate or robustness. The digital telemetry system of the invention includes a data transmission cable having a first end and a second end, and capable of transmitting data on at least two propagation modes. A data source is connected at the first end, has data transmission circuitry, and generates data signals on the at least two propagation modes. A receiver connected to the second end has a first receive circuitry to receive signals on a first of the at least two propagation modes and a second receive circuitry to receive signals on a second of the at least two propagation modes. An adaptive far-end cross-talk cancellation circuitry is connected to the first receive circuitry and to the second receive circuitry.

In one embodiment of the invention the adaptive far-end cross-talk cancellation circuitry adapts to changing conditions by continuously updating the cross-talk cancellation function. These updates are performed by providing a slice residual as input to a logic for updating the cross-talk cancellation function.

In another aspect the invention is a method for canceling the effect of far-end cross-talk on near-lying propagation modes. This method of digital telemetry provides improved data rate and robustness by canceling far-end cross-talk from a near-lying propagation mode. The method includes the steps of inputting a first sample on a first propagation mode; inputting a second sample on a second propagation mode; determining a cross-talk component from the second sample; and determining an output by subtracting the cross-talk component from the first sample.

Other aspects and advantages of the present invention will become apparent from the following detailed description, taken in conjunction with the accompanying drawings, illustrating by way of example the principles of the invention.

DETAILED DESCRIPTION OF THE PREFERRED EMBODIMENTS

Figure 1:
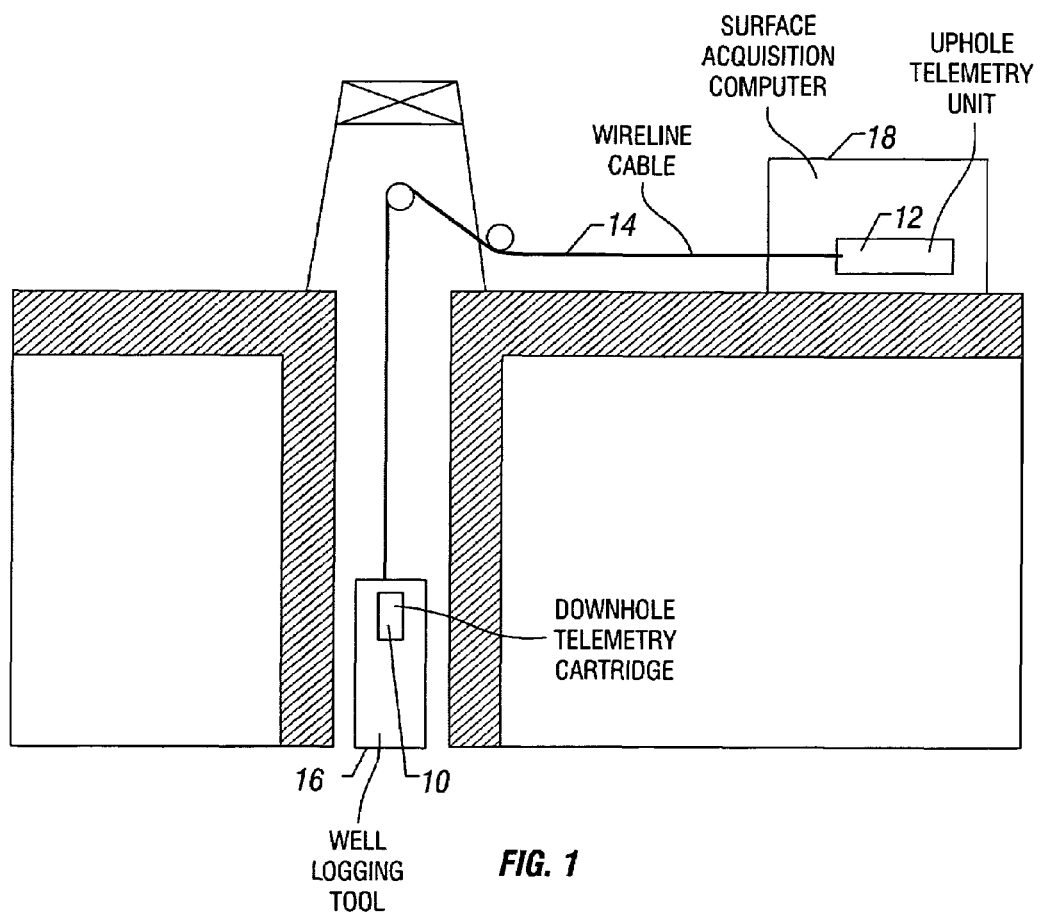
FIG. 1 is a schematic diagram illustrating a well-logging operation including application of the present invention.

In the following detailed description and in the several figures of the drawings, like elements are identified with like reference numerals.

A note on conventions used herein, "downlink" and "uplink" refer to the direction in which data is transmitted along a wireline cable, whereas "uphole" and "downhole" refer to locations of equipment. Thus, "uphole equipment" means equipment that is located at the surface of a logging job and "downhole equipment" refers to equipment located at the logging tool end of the wireline. The word "or" is herein used as the inclusive or. If the word "or" is to be interpreted as the exclusive or, that interpretation is explicitly set forth. The preceding note is for explanatory purposes and should not be used to limit the scope of the invention.

Overview of Wireline Telemetry System According to the Invention

As shown in the drawings for purposes of illustration, the invention is embodied in a novel well-logging telemetry system for transmitting well-bore data from logging tools to a data acquisition system on the surface. A system according to the invention provides for either single carrier or multi-carrier transmission of well-logging data over multiple propagation modes and dynamic far-end cross-talk cancellation thereby achieving an improved overall data rate or more robust data transmission.

In the drawings, a preferred embodiment wireline logging application is illustrated. As shown in FIG. 1, a downhole telemetry cartridge 10 is connected to a well-logging tool 16. In a well-logging operation often several tools 16 are connected into a tool string. The tools 16 communicate with the downhole telemetry circuits 10 via a bi-directional electrical interface. Typically the tools 16 are connected to the telemetry cartridge 10 over a common data bus. Alternatively, each tool may be directly connected to the telemetry cartridge 10. In one embodiment the telemetry cartridge 10 is a separate unit which is mechanically and electrically connected to the tools in the tool string. In an alternative embodiment, the telemetry cartridge is integrated into the housing of one of the well-logging tools 16.

Figure 2:
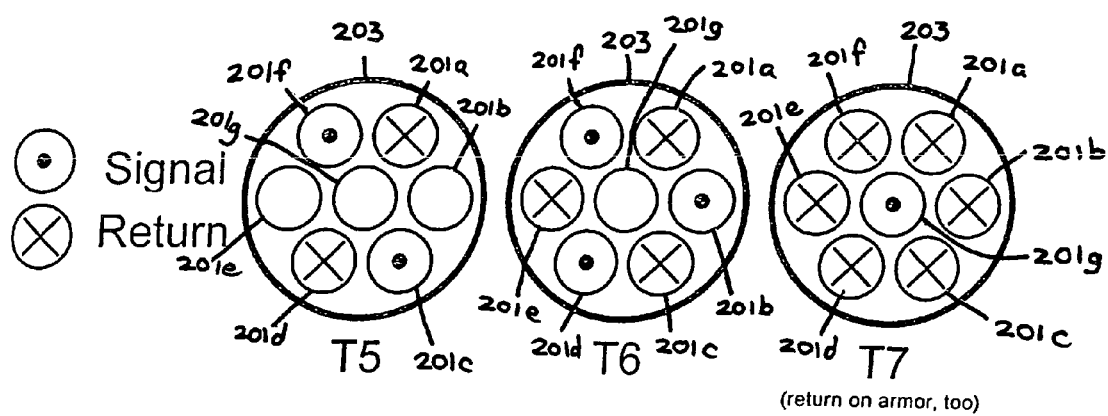
FIG. 2 is a schematic illustration of three propagation modes used on a wireline cable used in a well-logging operation as shown in FIG. 1.

The telemetry cartridge 10 is connected to a wireline cable 14. The tools 16, including the telemetry cartridge 10, are lowered into a well-bore on the wireline cable 14. In the preferred embodiment the wireline cable 14 is a heptacable. A heptacable consists of seven conductors—a central conductor surrounded by six conductors and an outer steel armor. A heptacable provides for several different signal propagation modes, each of which transmits signals on a specific combination of the seven conductors and armor. FIG. 2 is an illustration of the T5, T6, and T7 propagation modes. In the T5 mode, the signal is propagated on conductors 201$c$ and 201$f$, and the return is provided on conductors 201$a$ and 201$d$. In the T6 mode, the signal is propagated on conductors 201$b$, 201$d$, and 201$f$, and the return is on conductors 201$a$, 201$c$, and 201$e$. In the T7 mode, the signal is propagated on conductor 201$g$ and the return is on conductors 201$a$–201$f$ and on the surrounding armor 203.

To utilize more of the available bandwidth of the cable 14, in a preferred embodiment of the invention at least two propagation modes are used in parallel. When data is transmitted on near-lying cable pairs it is very likely that far-end cross-talk occurs between these cable pairs.

A surface data acquisition computer 18 is located at the surface end of the wireline cable 14. The data acquisition computer 18 includes an uphole telemetry unit 12. The data acquisition computer 18 provides control of the tools and processing and storage of the data acquired by the tools. The acquisition computer 18 communicates with the uphole telemetry unit 12 via a bidirectional electrical interface.

The uphole telemetry unit 12 modulates downlink commands from the acquisition computer 18 for transmission down the cable 14 to the tools 16 and demodulates uplink data from the tools 16 for processing and storage by the acquisition computer 18.

The downhole telemetry cartridge 10 contains circuitry to modulate uplink data from the tools 16 for transmission up the cable 14 to the data acquisition computer and demodulate downlink commands from the acquisition computer for the tools. In digital telemetry systems, for example, such as the one provided by the invention, analog measurements collected by the tools 16 are converted into a digital form. That conversion may either be accomplished by the tools 16 themselves or by the telemetry cartridge 10. In a preferred embodiment of the present invention, the telemetry cartridge 10 transmits the digital data on a plurality of carriers on the wireline cable 14 to the uphole telemetry unit 12. The uphole telemetry unit 12, in turn, provides the digital data to the surface data acquisition computer 18. The uphole telemetry unit 12 and the downhole telemetry cartridge 10 cooperate in tuning the system to achieve a high data rate.

Uphole Telemetry Unit 12

Uphole Downlink Path

Figure 3:
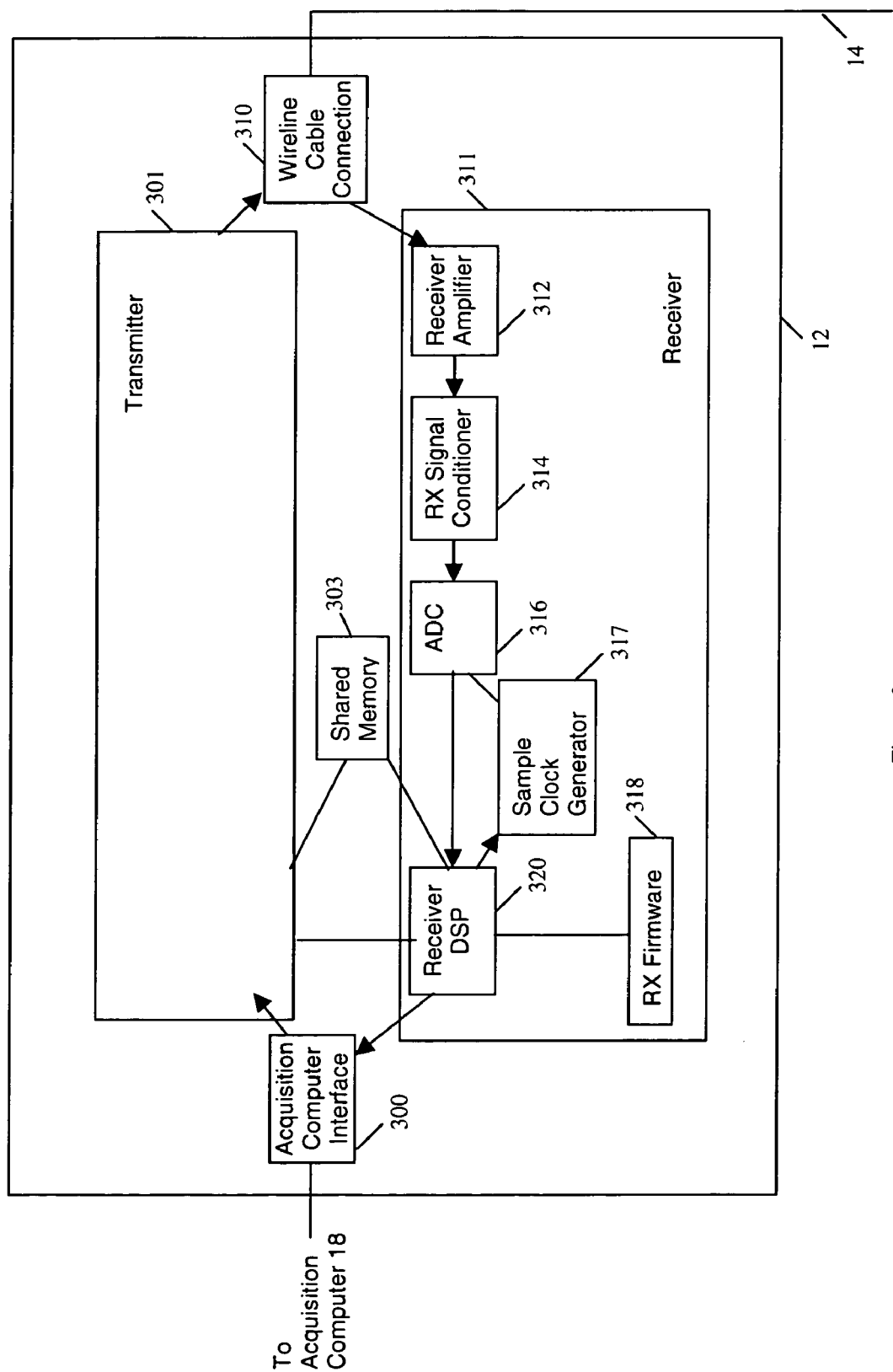
FIG. 3 is a block diagram of the surface telemetry unit used in a well-logging operation as shown in FIG. 1.

FIG. 3 is a schematic diagram of the of the uphole telemetry unit 12. The downlink path of the uphole telemetry unit 12 consists of an acquisition computer interface 300 and a transmitter 301. The transmitter 301 is connected to a wireline cable connection 310.

The acquisition computer interface 300 provides a bi-directional link between the uphole telemetry circuits and the other components of the acquisition computer 18. The interface to the acquisition computer 18 may be a proprietary bus or a general purpose bus (e.g., VME, ethernet). The acquisition computer interface 300 delivers downlink commands to the telemetry circuits, and this data is transmitted via the wireline cable 14 to the well-logging tools 16. The acquisition computer interface 300 is, for example, a programmable logic device or an application specific integrated circuit (ASIC).

Uphole Uplink Path

The uplink path of the uphole telemetry circuits consists of, again, the wireline cable connection 310 and a receiver 311. The receiver 311 consists of a receiver amplifier 312, a receiver signal conditioner 314, an analog to digital converter 316, a receiver DSP 320, and a receiver firmware 318, and is connected to the acquisition computer interface 300.

The receiver amplifier 312 receives data sent from the tools 16 via the downhole telemetry unit 12 and wireline cable 14. The data is received through the wireline cable connections 310. Cables with multiple conductors naturally support a variety of cable connection schemes. The output of the receiver amplifier 312 is an analog voltage waveform that represents the voltage waveform on the wireline cable 14. The receiver signal conditioner 314 applies gain and filtering to the received signal to match the amplitude and spectral content to the other telemetry circuits and to improve the processing results.

The ADC 316 converts the analog voltage waveform from the receiver signal conditioner 314 to digital samples that may be processed by digital computers such as the receiver DSP 320. The ADC 316 samples the waveform at the same frequency as that produced by the downhole telemetry cartridge 10. For example, if the downhole telemetry cartridge 10 produces samples at a rate of 300 kHz, the ADC 316 samples the waveform at 300 kHz. In alternative embodiments, the downhole telemetry cartridge 10 produces samples at other sampling rates.

The receiver DSP 320 processes the digital samples from the ADC 316 and demodulates the sequence of samples to obtain the uplink data sent by the tools 16. The receiver DSP 320 communicates this uplink data to the acquisition computer 18 via the acquisition computer interface 300. The operation of receiver DSP 320 is controlled by instruction sequences stored, for example, in receiver firmware 318. The parameters used by the receiver DSP 320 to demodulate the uplink data may be stored in the shared memory 303.

Uphole Receiver Firmware 318

Overview

The uphole receiver firmware 318 controls many aspects of the operation of the receiver DSP during the acquisition of data via the wireline 14. Co-pending patent application Ser. No. 09/471,659 describes some of these operations in greater detail.

Figure 4:
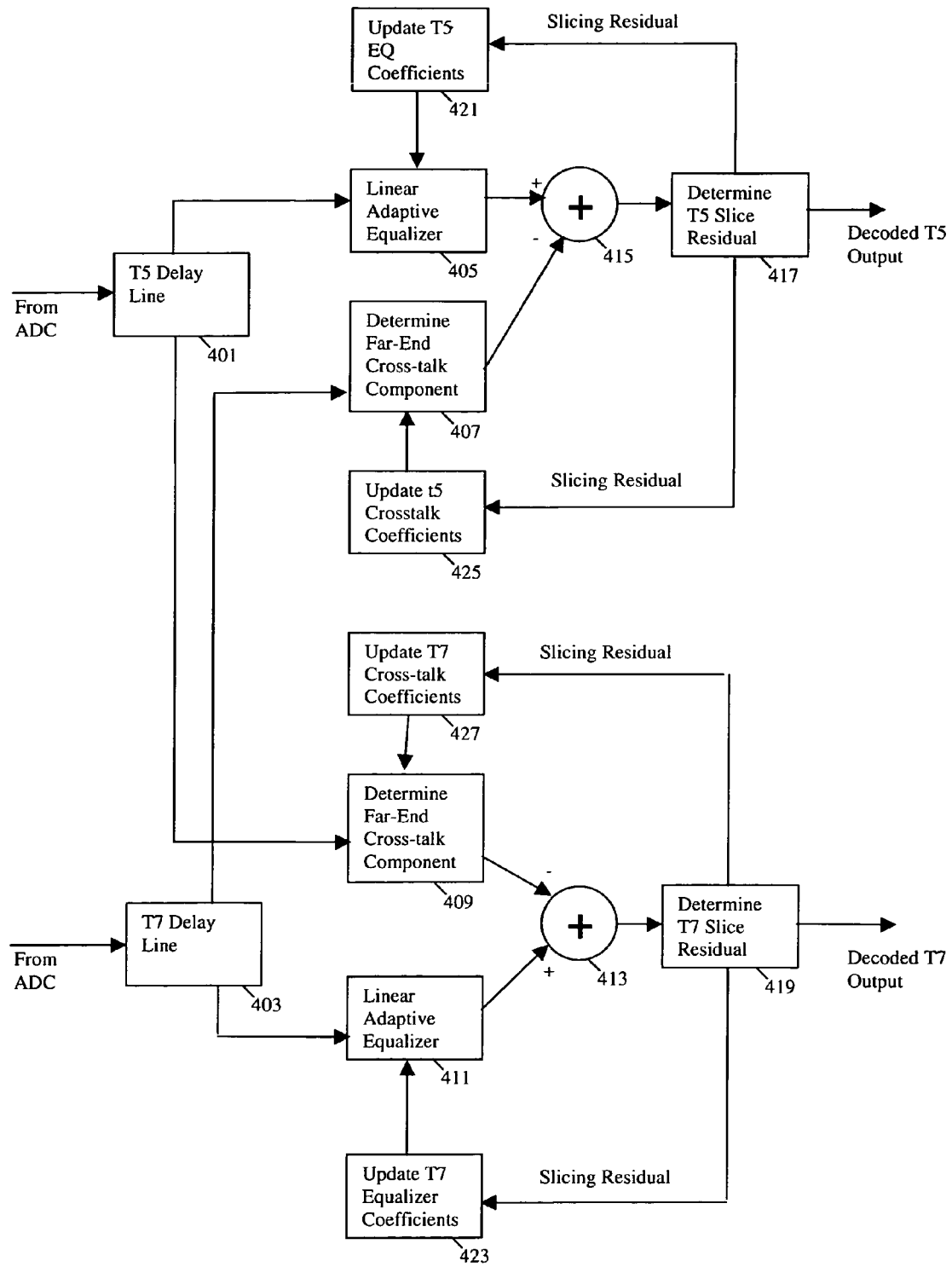
FIG. 4 is a block diagram of the control logic stored in the firmware of FIG. 3 for carrying out cross-talk cancellation in the time domain.
Figure 5:
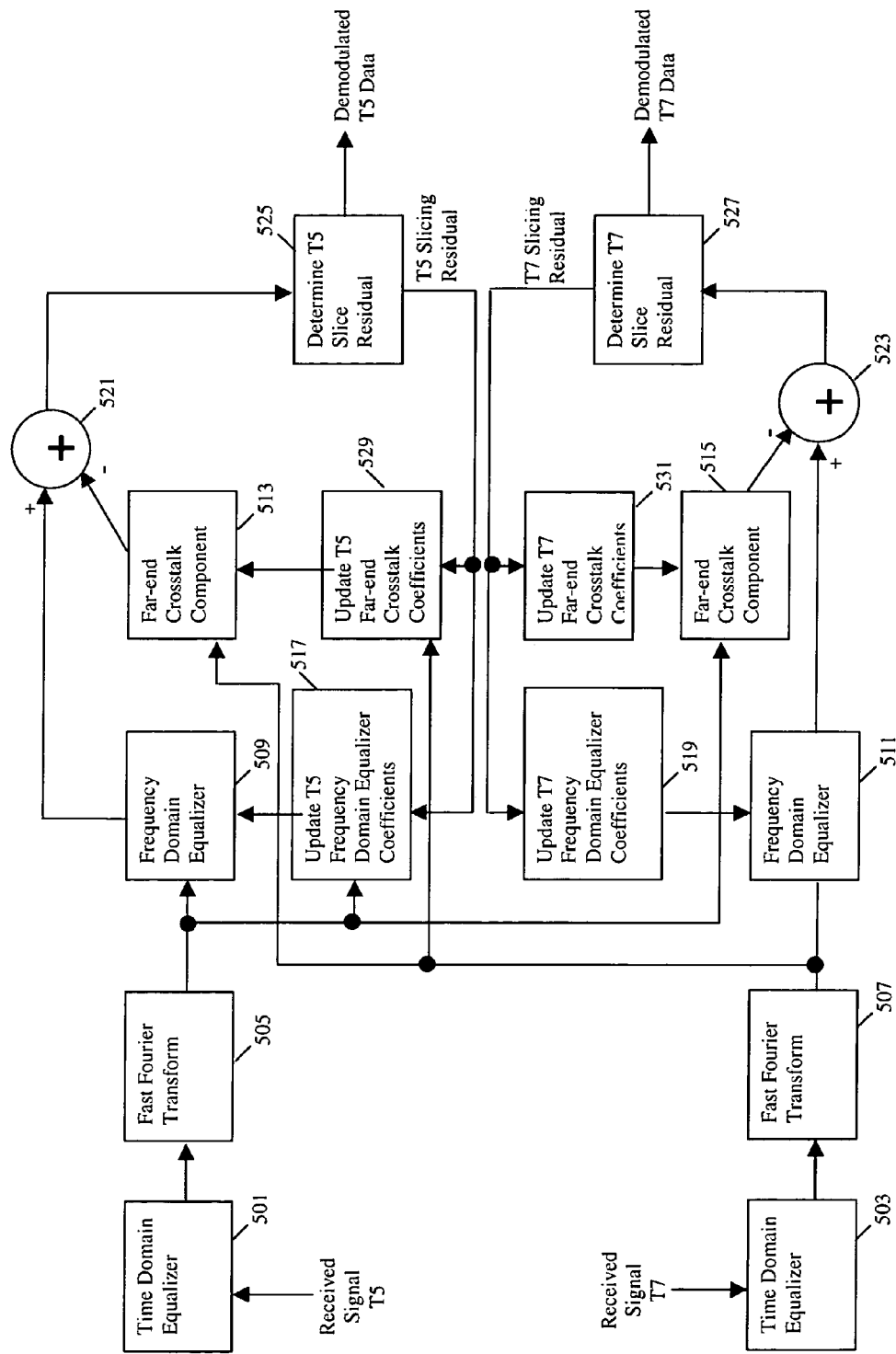
FIG. 5 is a block diagram of the control logic stored in the firmware of FIG. 3 for carrying out cross-talk cancellation in the frequency domain.

FIG. 4 is a dataflow diagram of a time domain based far-end cross-talk cancellation method of the uphole receiver firmware 318 and FIG. 5 is a frequency domain based far-end cross-talk cancellation method. The firmware 318 may be stored, for example, in a ROM, or an EPROM. Alternatively, the functionality provided by the DSP 320 and the firmware 318 may be implemented as an application specific integrated circuit (ASIC) or on a programmable logic array (PLA). In an alternative embodiment, the firmware 318 is replaced with software loaded into a random access memory (RAM) from a permanent storage device, EPROM or an EEPROM. That RAM may be integrated into the DSP 318. Accordingly, the methods of FIG. 4 and FIG. 5 may be stored in any of the aforementioned types of storage or any equivalent thereof. In most embodiments of the invention, either the time domain based method of FIG. 4 or the frequency domain based method of FIG. 5 is used. Therefore, the firmware 318 would in most cases only contain logic implementing one of these methods.

The uphole firmware 318 is responsible for receiving the analog signal from the logging cable and processing it appropriately so as to recover the binary data transmitted from the downhole telemetry cartridge 10.

The time domain based far end cross-talk cancellation method of FIG. 4 contains two data structures for receiving demodulated output from the ADC 316, namely a T5 Delay Line 401 and a T7 Delay Line 403. The demodulated data may be, for example, demodulated using a raised cosine filter and conversion to baseband as described in the 727 patent, herein incorporated by reference.

In the example, data is transmitted on the T5 and T7 modes. In alternative embodiments other or additional propagation modes may be used.

In a preferred embodiment the Delay Lines 401 and 403 are FIFO queues. It is not required that the queues are of the same length and the number of elements in each queue is an adjustable parameter. For this discussion, each queue has m elements.

To produce a data stream of points from the T5 line the data points from delay line 401 are first transmitted to a linear adaptive equalizer 405. The linear adaptive equalizer 405 convolutes the m data points and outputs T5TEQoutput to a summer 415 using the equation:

$$T5TEQoutput = \sum_{i=0}^{m} CE_i \cdot T5_{(m-i)}$$

Where $CE_i$ is the ith time domain equalizer coefficient and $T5_i$ is the ith sample in the delay line 401 for T5 propagation mode. In parallel with the equalization, the T7 cross-talk component of the output T5FEQoutput is determined. n values from the T7 delay line 403 are convoluted by the Linear Adaptive Cross-talk determination logic 407. The cross-talk component from the T7 propagation mode to the T5 propagation mode of a T5 sample is:

$$CT75 = \sum_{i=1}^{n} C75_i \cdot T7_{(n-i)}$$

Where C75i is the ith coefficient for cross-talk determination and T7i is the ith T7 value in the delay line 403 for the T7 propagation mode and I and n define the range of indexes for the T7 samples used in the cross-talk determination. The setting and adjustment of the C75i coefficients is described below.

Conversely the cross-talk component from the T5 propagation mode to the T7 propagation mode of a T7 sample is:

$$CT57 = \sum_{i=1}^{n} C57_i \cdot T5_{(n-i)}$$

Where C57i is the ith coefficient for cross-talk determination and T5i is the ith T5 value in the delay line 401 for the T5 propagation mode and I and n define the range of indexes for the T5 samples used in the cross-talk determination. The setting and adjustment of the C57i coefficients is described below.

To cancel the effect of far-end cross-talk from T7 onto T5, the cross-talk component, CT75, determined by the cross-talk determination logic 407 is subtracted from the output of the equalizer 405, T5TEQoutput, using the summer 415. Conversely, to cancel the effect of cross-talk from T5 onto T7, the cross-talk component, CT57, determined by the cross-talk determination logic 409 is subtracted from the output of the equalizer 411, T7TEQoutput, using the summer 413.

The coefficients C75i and C57i are initialized during start-up and adjusted during the transmission of data.

At startup the C75 and C57 coefficients may be initialized to zero. This has the effect that for the first data point no cross-talk cancellation is performed. The first data points are transmitted with very few bits per symbol, e.g., one bit per symbol. Even with fairly large cross-talk, the slicing residual, the error between the signal corresponding to the expected symbol and the received signal, would be small enough to permit accurate decoding of the received signal.

In an alternative embodiment, the C75 and C57 coefficients are initialized using a reference signal.

Figure 6:
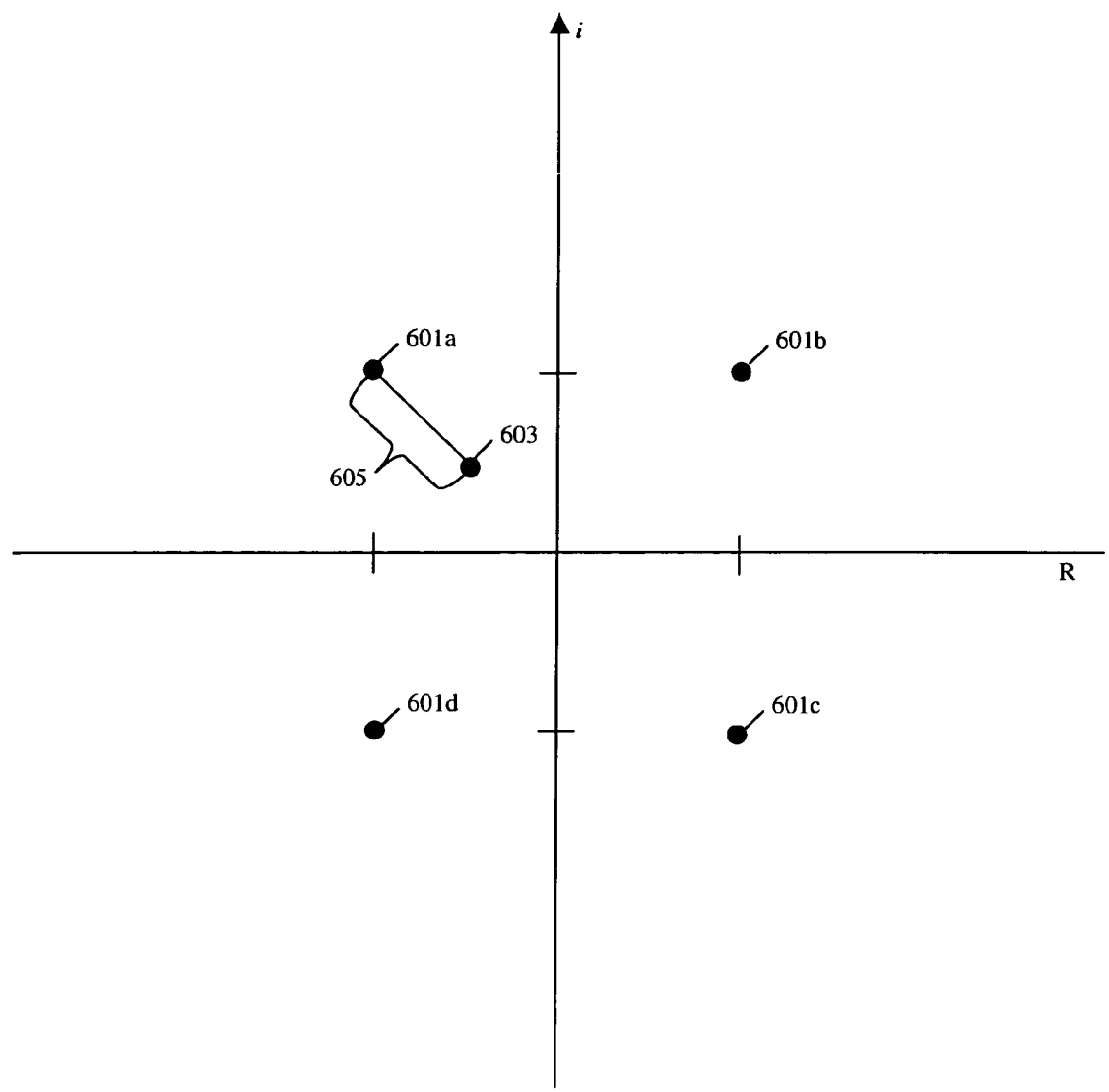
FIG. 6 is a complex coordinate system showing a four point quadrature amplitude modulation constellation.

FIG. 6 is a complex coordinate system showing a quadrature amplitude modulation constellation of expected values 601a–d. For illustrative purpose, FIG. 6 shows a four-point constellation. During the operation of the data transfer along a wireline cable, the number of constellation points used may vary. In some embodiments initial data is transmitted against a two-point constellation. During the course of operation as the FEQ and cross-talk cancellation coefficients are fine-tuned, the number of constellation points, or bits-per-symbol, may be increased.

Returning to the example of FIG. 6, each constellation point corresponds to a two-digit binary value, i.e., 00, 01, 10, or 11. Slice determination logic 417 and 419 determine which such binary value corresponds to the complex value received from summers 415 and 413, respectively. For example, if the received complex value corresponds to point 603, the slice logic would infer that the intended value is that which corresponds to point 601a, since that point lies nearest the received point. The slice logic 417 and 419 also determine the complex difference between these two points, the slice residual, 605.

The slicing residual is used to update the cross-talk cancellation coefficients input to the adaptive cross-talk component logic 407 and 409, respectively, and the linear adaptive equalization coefficients input into the linear adaptive equalizers 405 and 411, respectively. The properties of the transmission medium, the wireline, change with time. These changes may be due to temperature and also the effect of having more or less of the wireline coiled up on a reel. The update logic 421 and 423 update the linear adaptive equalizer coefficients accordingly by applying the following equation:

$CE5i = CE5i - \text{Alpha}TEQ*(1/REF\_MAGN^2)*$
$<T5(m-i),T5\text{residual}>$ where, < > is the complex scalar product, defined as
$<a+jb,c+jd> = (a+jb)*(c+jd) = (ac+bd)+j(ad-bc)$ T5Residual[i] is the slicing residual,
T5Residual=T5Corr−T5IdealPoint
where, T5Corr is the cross-talk corrected output from summer 415 and T5IdealPoint is the ideal constellation point for T5.

AlphaTEQ is a constant between 1 and 0, preferably close to zero, e.g., 0.001. AlphaTEQ balances the tracking speed of CE5i against the stability of the value CE5i.

REF_MAGN is the RMS magnitude of the demodulator output input to the T5 Delay Line 401.

The C75 and C57 coefficients are initialized to zero.

The FEXT coefficient update logic 452 updates the C75 FEXT coefficients by $C75i = C75i + \text{Alpha}FEXT*(1/REF\_MAGN^2)*$
$<T7_{(n-i)},T5\text{residual}>$ where, T5Residual is T5Corr−T5IdealPoint
where T5Corr is the cross-talk corrected output from summer 415 and T5IdealPoint is the ideal constellation point for T5.

AlphaFEXT is a constant between 1 and 0, preferably close to zero, e.g., 0.001. The constant AlphaFEXT balances the tracking speed of C75i against the stability of the value of C75i.

FIG. 5 is a block diagram of a method of cross-talk cancellation in the frequency domain according to an alternative embodiment of the invention. The signal streams on two propagation modes, e.g., T5 and T7, are partially equalized in the time domain by time domain equalizers 501 and 503, respectively, and transformed into the frequency domain using a Fast Fourier Transform (FFT), 505 and 507, respectively. The method of FIG. 5 may be used, for example, for implementations of transmitting data on the wireline cable using discrete multi-tone modulation (DMT) and is described herein, for illustrative purposes, in that context.

The output from each FFT 505 and 507 is an array of complex values each corresponding to a value transmitted on a particular carrier on one of the propagation modes. These arrays are further equalized in the frequency domain by frequency domain equalizers 509 and 511, respectively. This equalization is performed by multiplying each array element with a corresponding coefficient, i.e.:

*T5i FEQ* output=*CE5i\*T5i FFT* output

*T7i FEQ* output=*CE7i\*T7i FFT* output

Figure 7:
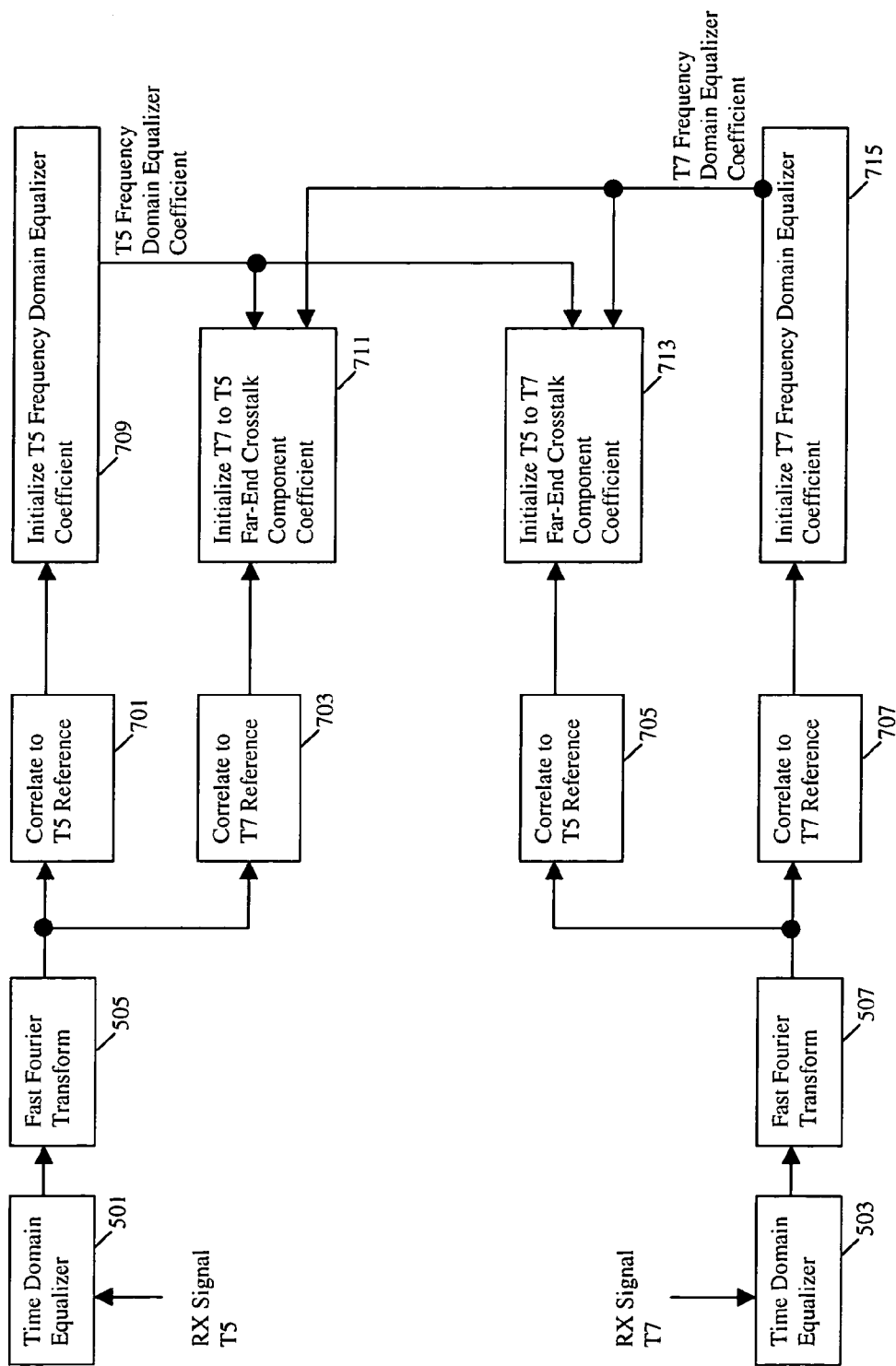
FIG. 7 is a data flow diagram illustrating the initialization of the frequency domain equalizer coefficients and the frequency domain cross-talk cancellation coefficients.

FIG. 7 is a data flow diagram illustrating the initialization of the FEQ coefficients and the frequency domain cross-talk cancellation coefficients.

The complex FEQ coefficients CE5i are initialized by first estimating the complex statistical correlation of the T5 reference signal with the received T5 signal.

The normalized statistical correlation between the T5 reference signal and the received T5 signal is:

E(<T5 reference, T5 received>/E(<T5 reference,T5 reference>)

This quantity is obtained by calculating 701:

$$(1/N) * \frac{\sum <T5REFdata\,[i,n], T5FFT\_out\,[i,n]>}{REF\_MAGN^2}$$

This correlation is inverted 709 to initialize the FEQ coefficients as follows:

$$CE5i = \frac{(N*REF\_MAGN^2)}{\sum <T5REFdata\,[i,n], T5FFT\_out\,[i,n]>}$$

The FEQ coefficients CE7i are initialized by first estimating the statistical correlation of the T7 reference signal with the received T7 signal.

The normalized statistical correlation between the T7 reference signal and the received T7 signal is:

E(<T7 reference,T7 received>/E(<T7 reference, T7 reference>)

This quantity is obtained by calculating 707:

$$(1/N) * \frac{\sum <T7REFdata\,[i,n], T7FFT\_out\,[i,n]>}{REF\_MAGN^2}$$

This correlation is inverted 715 to initialize the FEQ coefficients as follows:

$$CE7i = \frac{(N*REF\_MAGN^2)}{\sum <T7REFdata\,[i,n], T7FFT\_out\,[i,n]>}$$

where,
  i is the carrier number, proportional to the frequency of each carrier
  N is the number of samples used for equalization, n indexes those samples
  TSREFdata[i,n] are the complex reference constellation points for the ith carrier in the nth T5 DMT symbol
  T7REFdata[i,n] are the complex reference constellation points for the ith carrier in the nth T7 DMT symbol
  REF_MAGN is the RMS magnitude of the reference data points
  T7FFT_out[i,n] is the complex output from FFT 505 for the ith carrier in the nth T5 DMT symbol
  T7FFT_out[i,n] is the complex output from FFT 507 for the ith carrier in the nth T7 DMT symbol Returning now to FIG. 5, the FEQ coefficients are updated continuously by the FEQ coefficient update logic 517 and 519. These logic modules are described in greater detail below.

If there is any far-end cross-talk between the propagation modes, the output from the frequency domain equalizers 509 and 511 contains a cross-talk component. The far-end cross-talk determination circuit 513 and 515 determines that cross-talk component for the T5 and T7 propagation modes, respectively. For the T5 data, the cross-talk component is determined by:

$T5i\_FEXT\_com = C75i * T7iFFT\_out$ where,
  TSi_FEXT com is the output from far-end cross-talk determination logic 513
  C75i is the coefficient for canceling cross-talk from T7 to T5 on the ith carrier
  T7IFFT out is the output from the T7 FFT 507

Similarly, for the T7 data, the far-end cross-talk component is determined by:

$T7i\_FEXT\_com = C57i * T5iFFT\_out$ where,
  T7i_FEXT_com is the output from far-end cross-talk determination logic 515
  C57i is the coefficient for canceling far-end cross-talk from T5 to T7 on the ith carrier
  T5iFFT_out is the output from the T5 FFT 505

The far-end cross-talk components, T5i_FEXT_com and T7i_FEXT_com, are cancelled from the equalized data by subtraction operations 521 and 523, thus the corrected output from 521 and 523 are, respectively:

$T5i\_FEXT\_corr = T5i\_FEQ\_out - T5i\_FEXT\_com$ $T7i\_FEXT\_corr = T7i\_FEQ\_out - T7i\_FEXT\_com.$ Again making reference to the example of FIG. 6, slice determination logic 525 and 527 determine which such binary values correspond to the complex values received from summers 521 and 523, respectively. For example, if a received complex value corresponds to point 603, the slice logic would infer that the intended value, herein also referred to as the ideal point, is that value which corresponds to point 601a, since that point lies nearest the received point. The slice determination logic 525 and 527 decode the received value to the symbol corresponding to the ideal point. The slice logic 525 and 527 also determine the complex difference between these two points, the slice residual, 605.

The slicing residual is used to update the cross-talk cancellation coefficients and the frequency domain equalization coefficients. The properties of the transmission medium, the wireline, change with time. These changes may be due to temperature and also the effect of having more or less of the wireline coiled up on a reel. The update logic 517 updates the frequency domain equalizer coefficients for the T5 propagation mode accordingly by applying the following equation:

$CE5i = CE5i - AlphaFEQ * (<CE5i, CE5i>/REF\_MAGN^2) * <T5FFT\_out[i], T5residual[i]>$ where,
  T5Residual[i] is the slicing residual,
    T5Residual[i] = T5Corr[i] - T5IdealPoint[i]
    Where, T5Corr[i] is the cross-talk corrected T5 sample on data carrier i output from summer 521 and T5IdealPoint[i] is the ideal constellation point for T5 data carrier i
  AlphaFEQ is a constant between 1 and 0, preferably close to zero, e.g., 0.001. AlphaFEQ balances the tracking speed of CE5i against the stability of the value CE5i.

REF_MAGN is the Root Mean Square ("RMS") magnitude of TSFEQ_out, which in one embodiment is the same for all carriers.

Similarly, the update logic 519 updates the frequency domain equalizer coefficients for the T7 propagation mode by applying the following equation:

$CE7i = CE7i - \text{AlphaFEQ}^*(<CE7i, CE7i>/REF\_MAGN^2)^*<T7FFT\_\text{out}[i], T7\text{residual}[i]>$ where, T7Residual[i] is the slicing residual, T7Residual[i]=T7Corr[i]−T7IdealPoint[i]

Where, T7Corr[i] is the cross-talk corrected T7 sample on data carrier output from summer 523 and T7IdealPoint[i] is the ideal constellation point for T7 data carrier i AlphaFEQ is a constant between 1 and 0, preferably close to zero, e.g., 0.001. AlphaFEQ balances the tracking speed of CE7i against the stability of the value CE7i.

REF_MAGN is the RMS magnitude of T7FEQ_out.

The far-end cross-talk cancellation coefficients C75i are initialized by first estimating the statistical correlation of the T7 reference signal with the received T5 signal 703, scaled to facilitate application of the coefficient in the cancellation logic.

The scaled statistical correlation between the T7 reference signal and the received T5 signal is:

$E(<T7 \text{ reference}, T5 \text{ received}>/E(<T7 \text{ reference}, T7 \text{ reference}>)$ This quantity is obtained by calculating 703:

$$(1/N) * \frac{\sum <T7REFdata\,[i], T5FFT\_out\,[i]>}{\sum <T7REFdata\,[i], T7REFdata\,[i]>}$$

This correlation is used to initialize the cross-talk cancellation coefficients as follows 711:

$$C75i = CE5i * CE7i * (1/N) * \frac{\sum <T7REFdata\,[i], T5FFT\_out\,[i]>}{\sum <T7REFdata\,[i], T7REFdata\,[i]>}$$

The FEXT coefficient update logic 529 updates the FEXT coefficients by:

$C75i = C75i + \text{AlphaFEXT}^*(<CE7i, CE7i>/REF\_MAGN^2)^*<T7FFT\_\text{out}[i], T5\text{residual}[i]>$ Where, T5residual[i] is T5FFT out[i]−T5IdealPoint[i]

Where T5IdealPoint[i] is the ideal constellation point for T5 data carrier i.

AlphaFEXT is a constant between 1 and 0, preferably close to zero, e.g., 0.0001. The constant AlphaFEXT balances the tracking speed of C75i against the stability of the value of C75i. AlphaFEXT is a parameter that an operator may adjust to obtain optimal performance given the particular noise environment received. If AlphaFEXT is set close to 0 there is very little adjustment of the coefficients and the far-end cross-talk correction is very stable. Conversely, if AlphaFEXT is set to a higher value, the far-end cross-talk correction reacts very quickly to changes in cross-talk, but becomes more jittery. For wireline applications it has been found that values for AlphaFEXT between 0.001 and 0.00001 are appropriate.

The far-end cross-talk cancellation coefficients C57i are initialized by first estimating the statistical correlation of the T5 reference signal with the received T7 signal 705, scaled to facilitate application of the coefficient in the cancellation logic.

The scaled statistical correlation between the T5 reference signal and the received T7 signal is:

$E(<T5 \text{ reference}, T7 \text{ received}>/E(<T5 \text{ reference}, T5 \text{ reference}>)$ This quantity is obtained by calculating 705:

$$(1/N) * \frac{\sum <T5REFdata\,[i], T7FFT\_out\,[i]>}{\sum <T5REFdata\,[i], T5REFdata\,[i]>}$$

This correlation is used to initialize the cross-talk cancellation coefficients as follows 713:

$$C57i = CE7i * CE5i * (1/N) * \frac{\sum <T5REFdata\,[i], T7FFT\_out\,[i]>}{\sum <T5REFdata\,[i], T5REFdata\,[i]>}$$

The FEXT coefficient update logic 531 updates the FEXT coefficients by $C57i = C57i + \text{AlphaFEXT}^*(<CE5i, CE5i>/REF\_MAGN^2)^*<T5FFT\_\text{out}[i], T7\text{residual}[i]>$ Where, T7residual[i] is T7FFT_out[i]−T7IdealPoint[i]

Where T7IdealPoint[i] is the ideal constellation point for T7 data carrier i.

AlphaFEXT is a constant between 1 and 0, preferably close to zero, e.g., 0.0001. The constant AlphaFEXT balances the tracking speed of C57i against the stability of the value of C57i. AlphaFEXT is a parameter that an operator may adjust to obtain optimal performance given the particular noise environment received. If AlphaFEXT is set close to 0 there is very little adjustment of the coefficients and the cross-talk correction is very stable. Conversely, if AlphaFEXT is set to a higher value, the cross-talk correction reacts very quickly to changes in cross-talk, but becomes more jittery. For wireline applications it has been found that values for AlphaFEXT between 0.001 and 0.00001 are appropriate.

The foregoing describes preferred embodiments of the invention and is given by way of example only. The invention should not be limited to such examples. For example, for illustrative purposes only, the invention has been described using two frequently used propagation modes, the T5 and T7 modes. However, the invention is equally applicable to other propagation modes and can readily be extended to implementations employing more than two propagation modes. It is well within the grasp of a person of ordinary skill, reading this disclosure, to extend the concepts herein described to such other combinations of propagation modes. The invention has been described with a particular data flow for illustrative purposes. Modifications to that dataflow are also possible and are to be considered within the scope of the invention. The invention is not limited to any of the specific features described herein, but includes all variations thereof within the scope of the appended claims.

What is claimed is:

1. A digital telemetry system having improved data rate and robustness, comprising:
 a data transmission cable having a first end and a second end, and capable of transmitting data on at least two propagation modes;
 a data source connected at the first end and having data transmission circuitry to generate data signals on the at least two propagation modes;
 a receiver connected to the second end whereon the receiver receives signals on a first and second of at least two propagation modes and having
  a processor connected to a storage medium storing instructions directing the processor to execute
  an adaptive far-end cross-talk cancellation logic for canceling cross-talk that occurs between the first and second propagation modes, wherein the adaptive far-end cross-talk cancellation logic comprises
  a first propagation mode cross-talk adjustment logic to direct the processor to receive samples on the first propagation mode and having a second propagation mode cross-talk adjustment logic to direct the processor to accept samples from the second propagation mode wherein the first propagation mode cross-talk adjustment logic directs the processor to adjust the samples on the first propagation mode by values that are a function of the samples of the second propagation mode; and
 further comprises instructions to cause the processor to determine a slice residual from the output of each of the first and second mode cross-talk adjustment logics; and
 update a cross-talk parameter from the slice residual.

2. The digital telemetry system of claim 1, wherein the adaptive far-end cross-talk cancellation logic causes the processor to accept as input one value on each of a plurality of carriers and to compute the cross-talk component for each carrier.

3. The digital telemetry system of claim 2, wherein the adaptive far-end cross-talk cancellation logic directs the processor to compute the cross-talk component for each carrier by multiplying the signal received on the second propagation mode by a carrier specific coefficient.

4. The digital telemetry system of claim 3, further comprising a far-end cross-talk parameter update logic directing the processor to update each carrier specific coefficient as a function of the slice residual on such carrier.

5. The digital telemetry system of claim 1, wherein the first propagation mode cross-talk adjustment logic directs the processor to receive m samples from the second propagation mode and convolve the m samples using m coefficients.

6. The digital telemetry system of claim 5 wherein the storage medium further stores instructions comprising a slice determination logic and a coefficient update logic directing the processor to adjust the m coefficients as a function of the slice residual determined by the slice determination logic.

7. A digital telemetry system having improved data rate and robustness, comprising:
 a data transmission cable having a first end and a second end, and capable of transmitting data on at least two propagation modes;
 a data source connected at the first end and having data transmission circuitry to generate data signals on the at least two propagation modes;
 a receiver connected to the second end whereon the receiver receives signals on a first and second of at least two propagation modes and having
  a processor connected to a storage medium storing instructions directing the processor to execute
  an adaptive far-end cross-talk cancellation logic for canceling cross-talk that occurs between the first and second propagation modes,
  wherein the adaptive far-end cross-talk cancellation logic comprises a first propagation mode cross-talk adjustment logic to direct the processor to receive samples on a first frequency domain equalizer on the first propagation mode and having a second propagation mode cross-talk adjustment logic to direct the processor to accept samples to a second frequency domain equalizer from the second propagation mode wherein the first propagation mode cross-talk adjustment logic directs the processor to adjust the samples on the first propagation mode by values that are a function of the samples of the second propagation mode, and
  wherein the far-end adaptive cross-talk cancellation logic causes the processor to accept as input one value on each of a plurality of carriers to a far-end cross-talk determination circuit and to compute the cross-talk component for each carrier by multiplying the signal received on the second propagation mode by a carrier specific coefficient for the far-end cross-talk determination circuit and to update each carrier specific coefficient by applying the following:

$$CXYi = CXYi + \text{Alpha}FEXT * (<CEXi, CEXi>/ REF\_MAGN^2) * <TXFFT\_\text{out}[i], TY\text{residual}[i]>$$

where
CEXi is the frequency domain equalizer coefficient of the first frequency domain equalizer for the ith carrier of propagation mode X;
CXYi is the carrier specific coefficient for the far-end determination circuit for cancelling far-end cross-talk from the first propagation mode X to the second propagation mode Y;
AlphaFEXT is a constant for balancing the tracking speed of CXYi against the stability of the value of CXYi;
REF_MAGN is the Root Means Square (RMS) magnitude of CEXi;
TXFFT_out[i] is the frequency domain data point of the received sample on the ith carrier on propagation mode X;
TYresidual[i] is the slice residual for the ith data point on the Y propagation mode; and
< > is a complex scalar product defined as $<a+jb, c+jd> = (a-jb)*(c+jd) = (ac+bd) + j(ad-bc)$.

8. A digital telemetry system having improved data rate and robustness, comprising:
 a data transmission cable having a first end and a second end, and capable of transmitting data on at least two propagation modes;
 a data source connected at the first end and having data transmission circuitry to generate data signals on the at least two propagation modes;
 a receiver connected to the second end whereon the receiver receives signals on a first and second of at least two propagation modes and having
  a processor connected to a storage medium storing instructions directing the processor to execute
  an adaptive far-end cross-talk cancellation logic for canceling cross-talk that occurs between the first and second propagation modes, the adaptive far-end cross-talk cancellation logic comprising a first propagation mode cross-talk adjustment logic to direct the processor to receive samples to a first linear adaptive equalizer on a first propagation mode and having a second propagation mode cross-talk adjustment logic to direct the processor to accept samples to a second linear adaptive equalizer from the second propagation mode wherein the first propagation mode cross-talk adjustment logic directs the processor to adjust the samples on the first propagation mode by values that are a function of the samples of the second propagation mode, wherein the first propagation mode cross-talk adjustment logic directs the processor to receive m samples to a linear adaptive cross-talk determination logic from the second propagation mode and convolve the m samples using m coefficients and the storage medium further stores instructions comprising a slice determination logic and a coefficient update logic directing the processor to adjust the m coefficients as a function of a slice residual determined by the slice determination logic using the following:

$CXYi = CXYi +$ where, $\text{Alpha}FEXT^*(<CEXi, CEXi>/REF\_MAGN^2)^* <TY_{(n-i)} TX\text{residual}>$ CEXi is the ith time domain equalizer coefficient of the first linear adaptive equalizer of the first propagation mode X;

CXYi is an ith coefficient for canceling far-end cross-talk of the linear adaptive cross-talk determination logic from the first propagation mode X onto the second propagation mode Y;

$TY_{(n-i)}$ is the (n−i)th sample from the second propagation mode Y;

TXresidual_is TXCorr−TXIdealPoint
 where TXCorr is the cross-talk corrected output from a summer and TXIdealPoint is an ideal constellation point for the first propagation mode X; and
 AlphaFEXT is a constant between 0 and 1;

REF_MAGN is the Root Means Square (RMS) magnitude of CEXi; and < > is a complex scalar product defined as $<a+jb, c+jd> = (a-jb)^*(c+jd) = (ac+bd)+j(ad-bc)$.

9. The digital telemetry system of claim 8, wherein AlphaFEXT is in the range from 0.00001 to 0.001.

10. A method of digital telemetry having improved data rate and robustness by canceling far-end cross-talk from a near-lying propagation mode, comprising:
 inputting a first sample received on a first propagation mode to a first frequency domain equalizer;
 inputting a second sample received on a second propagation mode to a second frequency domain equalizer;
 determining a slice residual;
 determining a cross-talk component from the second sample on the first sample;
 adjusting a function used to determine the cross-talk component of a far-end cross-talk determination circuit as a function of the slice residual; and
 determining an output by subtracting the cross-talk component from the second sample from the first sample, wherein the cross-talk component is determined by multiplying a carrier specific coefficient with a sample received on a corresponding carrier on the near-lying propagation mode and the coefficients is updated by applying the following:

$CXYi = CXYi + \text{Alpha}FEXT^*(<CEXi, CEXi>/REF\_MAGN^2)^* <TXFFT\_\text{out}[i], TY\text{residual}[i]>$ where
CEXi is the frequency domain equalizer carrier for the ith carrier of the first propagation mode X;
CXYi is the carrier specific coefficient for the far-end cross-talk determination circuit for the ith carrier for canceling far-end cross-talk from the first propagation mode X to the second propagation mode Y;
AlphaFEXT is a constant for balancing the tracking speed of CXYi against the stability of the value of CXYi;
REF_MAGN is the Root Means Square (RMS) CEXi;
TXFFT_out[i] is the frequency domain data point on the ith carrier of the first propagation mode X;
TYresidual[i] is the slice residual for the ith data point on the second propagation mode Y; and
< > is a complex scalar product defined as $<a+jb, c+jd> = (a-jb)^*(c+jd) = (ac+bd)+j(ad-bc)$.

11. A method of digital telemetry having improved data rate or robustness by canceling far-end cross-talk from a near-lying propagation mode, comprising:
 inputting a first set of samples received on a first propagation mode to a first linear adaptive equalizer;
 inputting a second set of samples received on a second propagation mode to a second linear adaptive equalizer;
 determining a cross-talk component by convolving the second set of samples, convolving comprising multiplying each sample in the second set of samples by a coefficient;
 determining an output by subtracting the cross-talk component of a linear adaptive cross-talk determination logic from a first set of samples on the first propagation mode;
 determining a slice residual between the output and an ideal point; and
 adjusting the coefficients as a function of the slice residual by applying the following:

$CXYi = CXYi +$ where, $\text{Alpha}FEXT^*(<CEXi, CEXi>/REF\_MAGN^2)^* <TY_{(n-i)} TX\text{residual}>$ CEXi is the ith time domain equalizer coefficient for the first propagation mode X;
$TY_{(n-i)}$ is the (n−i) set of samples from the second propagation mode Y;
TXresidual is TXCorr−TXIdealPoint
where TXCorr is the cross-talk corrected output from a summer and TXIdealPoint is an ideal constellation point for the first propagation mode X;
AlphaFEXT is a constant between 0 and 1; and
< > is a complex scalar product defined as $<a+jb, c+jd> = (a-jb)^*(c+jd) = (ac+bd)+j(ad-bc)$.

12. The method of claim 11 wherein AlphFEXT is in the range from 0.00001 to 0.001.

* * * * *